United States Patent [19]

Grasso

[11] 4,295,680
[45] Oct. 20, 1981

[54] UTILITY BUCKET SEAT

[76] Inventor: Michael Grasso, 24 Laurie Rd., Brentwood, N.Y. 11717

[21] Appl. No.: 92,109

[22] Filed: Nov. 7, 1979

[51] Int. Cl.³ .................... A47C 31/00; B63C 9/08
[52] U.S. Cl. ........................... 297/193; 9/11 R; 9/347; 206/315 R; 297/217
[58] Field of Search ............ 297/193, 192, 217, 463; 9/12, 11 R, 347; 206/315; 220/216, 212; 108/159

[56] References Cited

U.S. PATENT DOCUMENTS

| 100,801 | 3/1870 | Pratt | 9/12 |
| 2,603,028 | 7/1952 | Roberts | 297/193 X |
| 2,919,169 | 12/1959 | Jackson | 297/193 X |
| 3,114,574 | 12/1963 | Pryale | 297/193 |
| 3,520,008 | 7/1970 | Frieder et al. | 9/11 R |

FOREIGN PATENT DOCUMENTS 3714 of 1878 United Kingdom .................... 9/12

Primary Examiner—James T. McCall
Attorney, Agent, or Firm—Michael I. Kroll

[57] ABSTRACT

A portable bucket seat is provided said seat being lightweight and sized so that it fits the open end of a standard bucket of the type that are commonly used by fisherman. The bucket seat is buoyant and is used for a cover for said bucket in order to keep the fish fresh and is also adapted for use as a buoy marker, table top and cooler.

1 Claim, 3 Drawing Figures

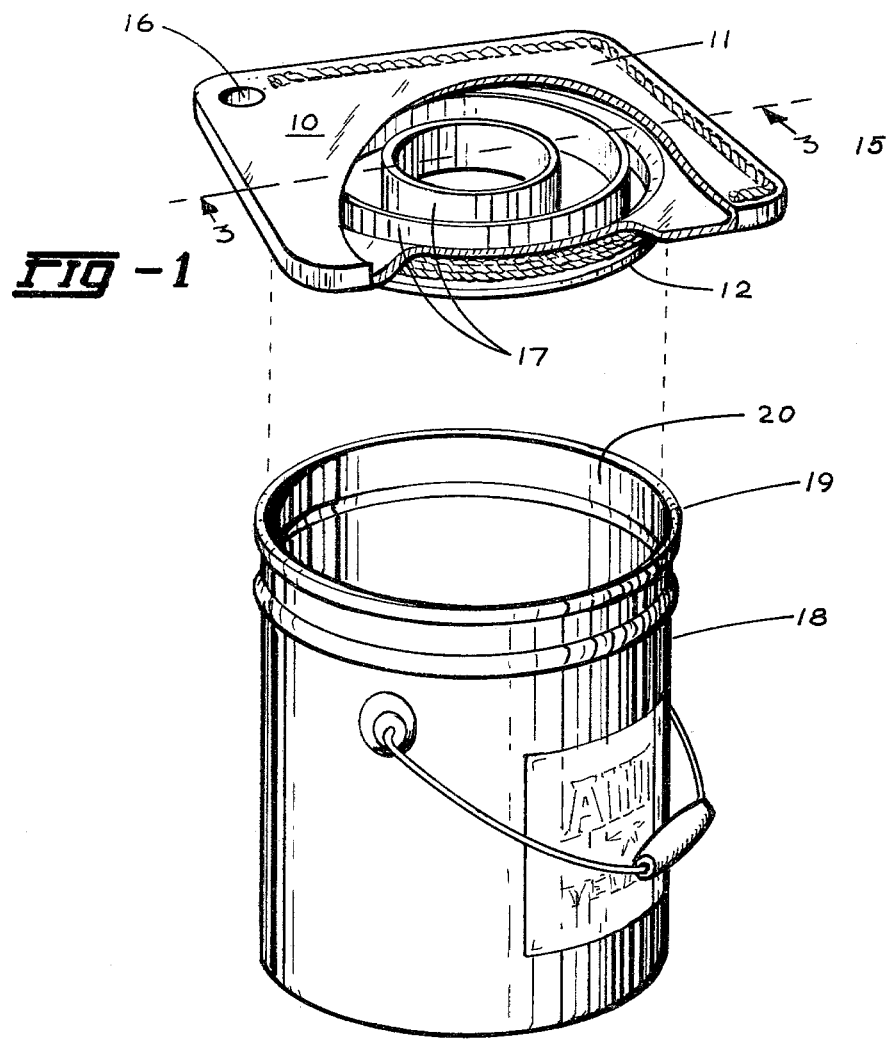
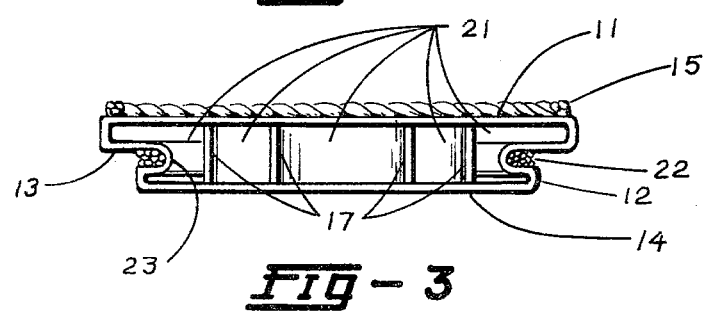

UTILITY BUCKET SEAT

BACKGROUND OF THE INVENTION

1. Field of Invention

The present invention relates to a utility bucket seat that is used in conjunction with a standard bucket, said seat used primarily by fisherman for a seat, for a table top, for keeping fish out of the sun and to keep flys and bugs off of said fish when fish are temporarily stored in a bucket, for a buoy marker and for a cooler.

2. Description of the Prior Art

The prior art shows many different types of apparatus for use when an individual sits out of doors there being countless types and shapes of chairs both folding and non-folding. However most if not all of said apparatus are restricted to a single use, are rather large in physical size, are not easily transported and are relatively expensive. The instant invention however provides a bucket seat that has many uses and overcomes the disadvantages of the prior art.

SUMMARY OF THE INVENTION

The instant invention shows an apparatus for seating, for a cover to keep fish fresh while said fish are in a bucket, for a table top, for a buoy marker and for a cooler.

It is accordingly an object of this invention to provide a portable lightweight seat that will fit on a standard bucket that is normally carried by fisherman said seat to fit over the open end of the bucket.

It is another object of this invention to provide a bucket seat that will act as a cover on said bucket and will thus act to keep the fish in the bucket fresh during the course of the day by keeping the hot sun off the fish and by keeping flies from entering the bucket.

It is a further object of the instant invention to provide a portable table top where one may use for such purposes as playing cards, cutting bate and alike.

A further object of the invention is to provide a buoy marker so that when for example an outboard motor is dropped overboard a buoy marker is available to mark its position so that the motor or alike may be located and so that fisherman may easily mark and return to a specific location.

Another object of the invention is to provide a fisherman with the means to easily carry a seat or chair compactly and at the same time carry a cover for fish and a buoy marker all of said items easily carried since they are a single unit.

Another object of the invention is to convert a standard bucket into an ice chest or cooler for storage of ice, cold beverages and alike.

DESCRIPTION OF THE DRAWINGS

FIG. 1 is a perspective cut-away view of the bucket seat.

FIG. 2 is a perspective view of a typical bucket whereon said bucket seat is located.

FIG. 3 is a cross-sectional view of the bucket seat along lines 3—3.

DESCRIPTION OF THE PREFERRED EMBODIMENTS

Referring to FIGS. 1, 2 and 3 of the drawing a seat generally designated 10 is provided with a flat top seat section 11 said flat top seat section being the surface that is used for the purpose of seating. Weight bearing flange 13 is positioned under flat top seat section 11 said weight bearing flange coming into contact and supported by top rim 19 of pail 18. Pail 18 is of a standard type and may be of any size but is usually five gallons in volume. Said pails are often times carried by fisherman for the sole purpose of storing fish but as herein described said pail now acts as the base for the instant invention. Said pail has inside top rim 20 which is vertical and into which fits alignment member 12 of the portable bucket seat so that the bucket seat is centrally aligned and positioned on the open end of pail 18. Said alignment member 12 is positioned at the bottom most part of seat 10 and directly underneath weight bearing flange 13.

At the bottom most section of seat 10 is positioned bottom section 14 which is generally flat and parallel to top seat section 11. Lip 15 is located around and on top of top seat section 11 said lip to provide a barrier so that items placed on top of top seat section 11 will not roll off of said top seat section 11 said lip being a nominal height of one eighth to one quarter inch high although the height is not critical.

Located between weight bearing flange 13 and alignment member 12 is rope holder 23 said rope holder being in the shape of a groove and generally convex so that rope 22 can be wound around said rope holder 23. Rope holder 23 can also be positioned at the bottom of bottom section 14 and shaped in a variety of ways. Rope 22 is wound around and fits into rope holder 23 with the outer most coil not projecting beyond aligning member 12 so that rope 22 does not interfer with inside top rim 20 of pail 18. One end of rope 22 is securely affixed (not shown) to seat 10 and in use the user ties the loose end onto a weight (not shown) said weight being thrown into the water with rope 22 unwinding from rope holder 23 with seat section 11 thus acting as a marker so that a specific position in the water may be located at a later time.

Hole 16 is provided in top seat section 11 and weight bearing flange 13 so that a rope may also be attached thereto. Internal sections 21 of seat 10 is water tight so that the seat is buoyant. Internal sections 21 may be hollow or may be filled up with any type of strengthening material. As shown strengthening members 17 provide strength said members being circular members located between the bottom of top seat section 11 and the top of bottom section 14. Said strenghtening member need not be of any particular shape so long as they give support and provide rigidity to seat 10.

The materials of construction for seat 10 may be of any number of types including metal, plastic, wood or a combination of these so long as the general functions of the seat are maintained.

While the form of the apparatus herein described constitutes a preferred embodiment of the invention it is to be understood that the invention is not limited to this precise form of apparatus and that changes may be made therein without departing from the scope of this invention.

Having regard to the foregoing disclosure the following is claimed as the inventive and patentable embodiments thereof:

1. A seat used in association with a pail for sitting, for use as a buoy, for use as a table top and for use as a cover, which comprises:
   (a) a top seat section for sitting;
   (b) a weight bearing flange for resting on the open end of a pail;
   (c) a buoyant internal section so that the seat will float; and
   (d) means to attach and store a rope to said seat.

* * * * *